Aug. 7, 1956 D. S. HERSEY 2,757,900
TURBINE ROTOR CONSTRUCTION
Filed June 1, 1950
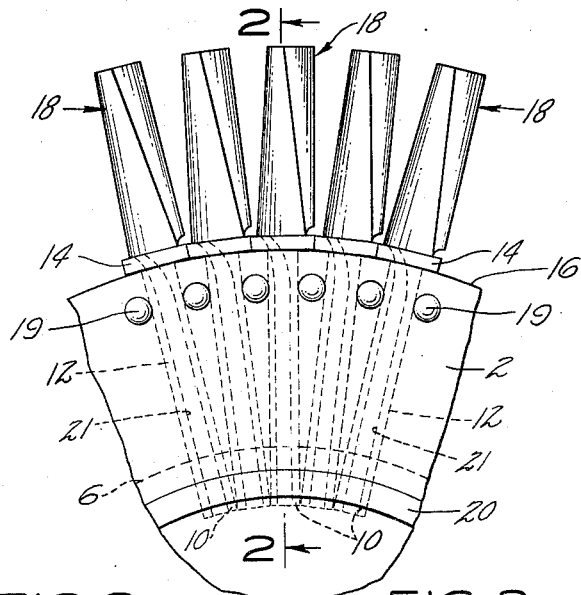
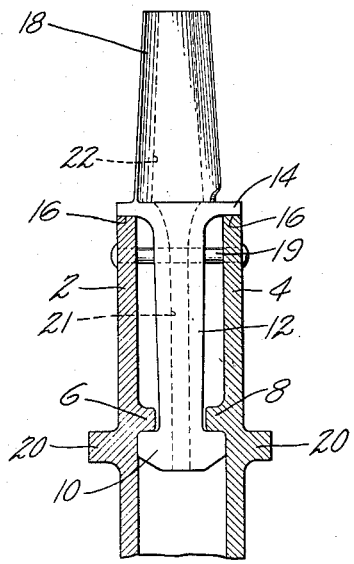
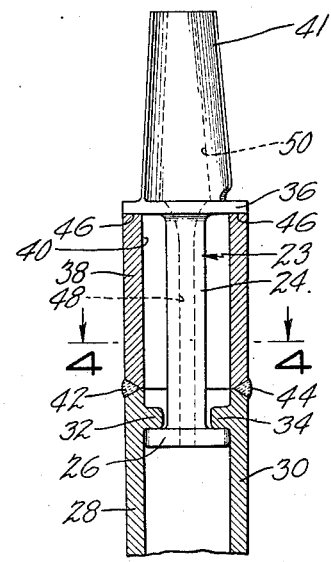
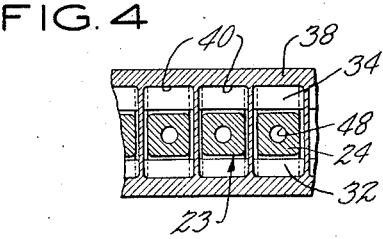
INVENTOR
DONALD S. HERSEY
BY Charles A. Warren
ATTORNEY

United States Patent Office 2,757,900
Patented Aug. 7, 1956

2,757,900

TURBINE ROTOR CONSTRUCTION

Donald S. Hersey, East Hartford, Conn., assignor to United Aircraft Corporation, East Hartford, Conn., a corporation of Delaware Application June 1, 1950, Serial No. 165,384

2 Claims. (Cl. 253—39)

This invention relates to bladed discs and particularly to discs adapted for use in gas turbine power plants.

The gas turbine is subject to extreme temperatures in operation in order to obtain adequate power output and economy. To withstand these temperatures the blades are generally of a heat resistant alloy and the supporting hub or disc is made of a less heat resistant alloy with the periphery of the disc slotted to receive the blade roots. Since the periphery of the discs operates at nearly the same temperature as the blades the disc is subject to failure where the blades are fastened to the disc. A feature of this invention is the location of the blade support at a point spaced a substantial distance radially inward from the periphery of the disc in such a way that the blade fastening is located at a point where the temperatures are relatively low.

Another feature is an arrangement for holding the blades which is simpler than the well-known axially extending blade slots and which provides for easy assembly and disassembly.

Attempts have been made to hold the blades on the disc by welding but such fastening prevents disassembly without damage to the blade roots. A feature of this invention is a welded assembly from which the blade may be removed without being damaged. Another feature is the location of the fastening means in the welded assembly at a point remote from the periphery of the disc.

Other objects and advantages will be apparent from the specification and claims, and from the accompanying drawings which illustrate an embodiment of the invention.

Fig. 1 is a fragmentary side elevation of the bladed turbine disc.

Fig. 2 is a sectional view on line 2—2 of Fig. 1.

Fig. 3 is a sectional view similar to Fig. 2 showing a modification.

Fig. 4 is a fragmentary sectional view on line 4—4 of Fig. 3.

Referring first to Figs. 1 and 2, the hub of the blade disc is made up of opposed disc elements 2 and 4 having oppositely located inwardly projecting annular flanges 6 and 8, respectively, which are concentric to the axis of the disc elements. These flanges engage with the blade root 10 forming part of the blade structure. The root 10 is wide enough to engage with the opposite surfaces of the discs, and the flanges 6 and 8 overlie the root and extend almost to the stem 12 which extends radially outward from the blade root.

The blade structure includes, in addition to the blade root 10 and the stem 12, a shroud 14 located at the outer end of the stem and wide enough in an axial direction to overlie the outer peripheral surfaces 16 of the disc elements. The disc elements extend radially outward beyond the flanges 6 and 8 and engage the underside of the shroud to support the blade structure against tipping in an axial or circumferential direction. As shown in Fig. 1, these shroud elements 14 are also wide enough in a circumferential direction to engage with the shroud on the adjacent blade structure thereby maintaining the circumferential spacing of the blades.

The blade structure also includes a blade section 18 extending outwardly from the shroud and forming the operative part of the blade element, that is to say, the portion of the blade over which the power fluid flows in imparting rotation to the disc.

In assembly, the row of blade elements may be placed in position on one of the disc elements, as for example element 2, and the other disc element 4 is then placed in position such that the blade structures are properly supported against radial movement by the flanges 6 and 8, against axial and circumferential movement by the periphery 16 of the disc elements, and with adjacent blades circumferentially spaced by the adjacent shroud elements 14. The discs may then be held in proper relation to each other as by several rivets 19 located preferably at a point radially outward of the supporting flanges 6 and 8 but still at a point spaced from the periphery of the disc elements. The assembled hub and blades may form a part of a multistage disc in which the several discs are held together by a central through bolt, with adjacent discs suitably spaced apart by laterally extending flanges 20 externally of the discs, as shown for example in Soderberg Patent No. 2,461,242 dated February 8, 1949.

The blade root and stem may be cooled to reduce the operating temperature of these parts. For this purpose the stem has a central passage 21 having an open inner end and connecting with a radial passage 22 in the blade portion. Cooling air admitted to the space between the disc elements 2 and 4 flows through these passages and cools the root, stem and blade portions. Air under pressure may reach the space between the discs by any suitable arrangement as, for example, the arrangement disclosed in the copending application of Kalitinsky and Soderberg, Serial No. 550,885, filed August 23, 1944, now Patent No. 2,532,721.

The arrangement of Figs. 3 and 4 is similar in that the blade structure 23 has an elongated stem 24 with a blade root 26 on its inner end. The blade root is clamped between opposed disc elements 28 and 30. These disc elements have laterally projecting opposed flanges 32 and 34, respectively, which extend over and hold the blade roots in position. The discs support an annular ring 38 which, as best shown in Fig. 3, is positioned radially outward of the rims of the discs and located between the rims and the shroud 36 on the blade structure. The ring 38 has radially extending openings 40, Fig. 4, large enough to allow the blade root 26 to pass therethrough in the assembly of the rotor. The blade structure has a blade portion 41 extending radially outward from the shroud 36, as will be apparent. Cooling passages 48 and 50 in the stem and blade portion provide for cooling, as above described.

In the assembly of this device, the blade structures are positioned in predetermined relation to the ring 38 by inserting the blade roots therethrough and the disc elements 28 and 30 are then placed in the position shown with the flanges 32 and 34 overlying the blade roots. A ring of weld material 42 is then provided for holding the disc 28 in predetermined relation and a similar weldment 44 holds the periphery of the disc 30 to the ring 38. Thus in this arrangement, as in the arrangement of Figs. 1 and 2, a blade structure is supported radially by the flanges 32 and 34, supported axially by the outer periphery 46 of the ring 38 which engages the under surface of the shroud, and supported circumferentially by interengagement of adjacent shrouds. In the event of damage to the rotor or to one or more of the blade structures thereon the rotor may be disassembled by machining out the weldments 42 and 44 without damaging the blade structures in any way.

It will be apparent that by spacing the blade root at a substantial distance radially inward from the periphery of the disc, the blade supporting structure is subjected to much less extreme temperatures thereby eliminating root failures due to excessive metal temperatures. The assembled rotor will therefore be capable of operating at higher temperatures since the limiting temperature is imposed by the material of the blade structure rather than by the supporting means for the blade.

It is to be understood that the invention is not limited to the specific embodiment herein illustrated and described, but may be used in other ways without departure from its spirit as defined by the following claims.

I claim:

1. In a rotor construction for turbines and the like, a hub made up of a pair of complementary discs, each disc having a single blade supporting flange thereon spaced a substantial distance radially inward from the periphery of the disc, the flanges on the discs being on the adjacent surfaces thereof and being spaced equally from the peripheries of the respective discs, in combination with blade structures having roots engaging with the radially inward surfaces on the flanges such that the flanges support the blade structures against radial movement outward of the discs, each blade structure having a blade stem extending radially outward a substantial distance from said root, a shroud element on the outer end of each stem and a blade portion extending radially outward from each shroud, the stems of adjacent blade structures being spaced apart circumferentially from the roots to the shrouds such that the stems are out of contact with each other between the root and shroud, the stems of the blades also being narrower in an axial direction than the spacing of the adjacent surfaces of the discs such that the stems are spaced from the discs for their entire length, the periphery of each disc engaging with the underside of said shrouds to support the blade structures against movement radially inward of the discs and means for holding said discs in axial relation to each other.

2. In a rotor construction for turbines and the like, a hub made up of a pair of complementary discs, each disc having a single blade supporting flange thereon spaced a substantial distance radially inward from the periphery of the disc, the flanges on the discs being on the adjacent surfaces thereof and being spaced equally from the peripheries of the respective discs, in combination with blade structures having roots engaging with the radially inward surfaces on the flanges such that the flanges support the blade structures against radial movement outward of the discs, each blade structure having a blade stem extending radially outward a substantial distance from said root, a shroud element on the outer end of each stem and a blade portion extending radially outward from each shroud, the stems of adjacent blade structures being spaced apart circumferentially from the roots to the shrouds such that the stems are out of contact with each other between the root and shroud, the stems of the blades also being narrower in an axial direction than the spacing of the adjacent surfaces of the discs such that the stems are spaced from the discs for their entire length, the periphery of each disc engaging with the underside of said shrouds to support the blade structures against movement radially inward of the discs and means for holding said discs in axial relation to each other, said means being in the form of rivets extending through the disc between and spaced from the flanges on the discs and the peripheries of the discs, said rivets passing between the stems of adjacent blade structures.

References Cited in the file of this patent

UNITED STATES PATENTS

| | | |
|---|---|---|
| 532,232 | DeLaval | Jan. 8, 1895 |
| 648,158 | Zoelly | Apr. 24, 1900 |
| 841,503 | Gelpke et al. | Jan. 15, 1907 |
| 2,494,658 | Highberg et al. | Jan. 17, 1950 |
| 2,628,066 | Lombard et al. | Feb. 10, 1953 |
| 2,686,655 | Schorner | Aug. 17, 1954 |

FOREIGN PATENTS

| | | |
|---|---|---|
| 165,854 | Germany | Dec. 1, 1905 |
| 359,350 | Great Britain | Oct. 22, 1931 |
| 617,472 | Great Britain | Feb. 7, 1949 |
| 635,783 | Great Britain | Apr. 19, 1950 |
| 675,222 | Germany | May 3, 1939 |
| 711,421 | France | June 30, 1931 |
| 900,378 | France | Oct. 2, 1944 |
| 900,439 | France | Oct. 2, 1944 |